(12) United States Patent
Wang et al.

(10) Patent No.: US 9,903,997 B2
(45) Date of Patent: Feb. 27, 2018

(54) LIGHT TRANSMISSION DEVICE, BACKLIGHT MODULE AND DISPLAY DEVICE

(71) Applicant: BOE TECHNOLOGY GROUP CO., LTD., Beijing (CN)

(72) Inventors: Shang Wang, Beijing (CN); Qiuxiang Li, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 645 days.

(21) Appl. No.: 14/498,245

(22) Filed: Sep. 26, 2014

(65) Prior Publication Data

US 2015/0362655 A1    Dec. 17, 2015

(30) Foreign Application Priority Data

Jun. 13, 2014 (CN) .......................... 2014 1 0265854

(51) Int. Cl.
*F21V 8/00* (2006.01)
(52) U.S. Cl.
CPC .................................. *G02B 6/0038* (2013.01)
(58) Field of Classification Search
CPC ...................................................... G02B 6/0038
See application file for complete search history.

(56) References Cited

U.S. PATENT DOCUMENTS

| | | | | |
|---|---|---|---|---|
| 9,004,726 B2 * | 4/2015 | Vasylyev | ............. | G02B 5/0236 362/326 |
| 2006/0098456 A1 * | 5/2006 | Sakamoto | ............. | G02B 6/0038 362/625 |
| 2008/0225554 A1 * | 9/2008 | Ting | .................... | G02B 6/0035 362/620 |
| 2009/0052207 A1 | 2/2009 | Chen et al. | | |
| 2012/0002437 A1 * | 1/2012 | Yabe | .................... | G02B 6/0028 362/606 |
| 2015/0138788 A1 * | 5/2015 | Lee | ....................... | F21S 48/215 362/478 |

FOREIGN PATENT DOCUMENTS

| | | |
|---|---|---|
| CN | 1441298 A | 9/2003 |
| JP | 2000-347041 A | 12/2000 |
| JP | 2004-021002 A | 1/2004 |
| JP | 2011-228275 A | 11/2011 |

OTHER PUBLICATIONS

Office Action in Chinese Patent Application No. 201410265854.2, dated Mar. 31, 2016.

* cited by examiner

*Primary Examiner* — Anabel Ton
(74) *Attorney, Agent, or Firm* — Brooks Kushman P.C.

(57) ABSTRACT

The present disclosure discloses a light transmission device including a first prism layer. The first prism layer includes a plurality of first prism bars formed on a surface of the first prism layer facing away from the panel, and a plurality of reflective grooves formed on a surface of the first prism layer facing the panel. Each of the reflective grooves includes a plurality of reflective surfaces matching with prism surfaces of the first prism bars; the reflective surfaces reflect received light to corresponding prism surfaces; the prism surfaces of the first prism bars are configured to emit received light reflected from the corresponding reflective surfaces towards the panel in a first direction.

20 Claims, 6 Drawing Sheets

LIGHT TRANSMISSION DEVICE, BACKLIGHT MODULE AND DISPLAY DEVICE

CROSS-REFERENCE TO RELATED APPLICATION

This application claims priority to Chinese Patent Application No. 201410265854.2 filed on Jun. 13, 2014, the disclosures of which are incorporated in their entirety by reference herein.

TECHNICAL FIELD

The present disclosure relates to the field of display technology, and more particularly to a light transmission device, a backlight module and a display device.

BACKGROUND

Liquid crystal displays (LCDs) have been widely applied in a variety of electronic products. Most of the LCDs are backlight type liquid crystal displays each including a liquid crystal panel and a backlight module. The backlight modules may be divided into side-light type backlight modules and direct-light type backlight modules according to different incident positions of light sources.

In order to improve brightness of the backlight modules, a prism light guide plate appears. Since scattering occurs at the prism light guide plate, thus light enters a panel with a large angle of incidence, and display effects will be affected. If the angle of incidence of a light source is too large, an emergence angle cannot completely reverse propagation directions of the light. Thus, normal backlighting cannot be formed in a front of the panel. Further, since light deflection occurs in an existing transparent display device, thus, objects behind the prism light guide plate cannot be seen through the prism light guide plate. Meanwhile, the prism light guide plate may cause scenery behind the prism light guide plate blurred.

SUMMARY

In order to solve the technical problem that display effects of an existing display device is affected due to a large angle of incidence of light entering a panel, embodiments of the present disclosure provide a light transmission device, a backlight module and a display device.

The present disclosure adopts following technical solution.

A light transmission device cooperated with a panel to form a display device, the light transmission device includes: a first prism layer; wherein the first prism layer includes a plurality of first prism bars formed on a surface of the first prism layer facing away from the panel, and a plurality of reflective grooves formed on a surface of the first prism layer facing the panel; each of the reflective grooves includes a plurality of reflective surfaces matching with prism surfaces of the first prism bars; the reflective surfaces reflect received light to corresponding prism surfaces; the prism surfaces of the first prism bars are configured to emit received light reflected from corresponding reflective surfaces towards the panel in a first direction.

Optionally, an angle between one of the reflective surfaces of one of the reflective grooves and a second direction which is perpendicular to the first direction is $\alpha$; an angle between a light incident on the one of the reflective surfaces and the second direction is $\beta$; an angle between the prism surface of the first prism layer corresponding to the one of the reflective surfaces and the first direction is $45°+\alpha+\beta/2$.

Optionally, an angle between one of the reflective surfaces of one of the reflective grooves and a second direction which is perpendicular to the first direction is $\alpha$; a light is incident on the one of the reflective surfaces in the second direction; an angle between the prism surface of the first prism layer corresponding to the one of the reflective surfaces and the first direction is $45°+\alpha$.

Optionally, angles between the reflective surfaces of one of the reflective grooves and the second direction are gradually increased or reduced along a direction from a position close to a light source to a position away from the light source.

Optionally, the light transmission device further includes: a second prism layer and a spacer layer; wherein the second prism layer includes a plurality of second prism bars formed on a surface of the second prism layer facing the first prism, and the second prism bars match the first prism bars; the spacer layer is disposed between the first prism layer and the second prism layer; the spacer layer has a refractive index lower than those of the first prism layer and the second prism layer; the second prism layer and the spacer layer are configured to adjust optical path deflection direction of ambient light when the ambient light enters the first prism layer to offset parts of deflection of the ambient light.

Optionally, the spacer layer is a rubber layer.

The present disclosure further provides a backlight module including the light transmission device.

Optionally, the backlight module further includes a collimated light source configured to provide collimated light for reflective grooves of the light transmission device.

Optionally, the collimated light source includes a light source, a doublet lens, a convex lens, a fly-eye lens group and a curved lens which are sequentially arranged.

The present disclosure further provides a display device including: a panel; and a light guide total reflection prism layer disposed on the panel; wherein the light guide total reflection prism layer includes a plurality of first prism bars formed on a surface of the light guide total reflection prism layer facing away from the panel, and a plurality of reflective grooves formed on a surface of the light guide total reflection prism layer facing the panel; each of the reflective grooves includes a plurality of reflective surfaces matching with prism surfaces of the first prism bars; the reflective surfaces reflect received light to corresponding prism surfaces; the prism surfaces of the first prism bars are configured to emit received light reflected from the corresponding reflective surfaces towards the panel in a first direction.

Optionally, the display device further includes: a spacer layer disposed on the light guide total reflection prism layer; and an optical path difference offset prism layer disposed on the spacer layer; wherein the optical path difference offset prism layer includes a plurality of second prism bars formed on a surface of the optical path difference offset prism layer facing the light guide total reflection prism layer, and the second prism bars match the first prism bars; the spacer layer has a refractive index lower than those of the optical path difference offset prism layer and the light guide total reflection prism layer.

Optionally, the display device further includes a collimated light source; the collimated light source is located at a side of the light guide total reflection prism layer; the display device is controlled to be in a backlight display mode or a transparent display mode by turning on or off the collimated light source; the backlight display mode is: the collimated light source is turned on, light beam emitted from the collimated light source irradiates on the reflective surfaces of the reflective grooves and is reflected by the reflective surfaces to the corresponding prism surfaces of the first prism bars, respectively, and is totally reflected at the corresponding prism surfaces of the first prism bars to emit towards the panel in the first direction; the transparent display mode is: the collimated light source is turned off, ambient light sequentially passes through the optical path difference offset prism layer, the spacer layer and the light guide total reflection prism layer, and then emits towards the panel in the first direction.

Optionally, the plurality of first prism bars are serrated; the plurality of second prism bars are serrated.

Optionally, the first direction is perpendicular to the panel.

The benefit effects of the present disclosure include: the light transmission device of one embodiment of the present disclosure uses cooperation between the prism bars and the reflective grooves to realize emitting light from a light source in a single direction towards the panel, thereby forming a backlight source with a narrow viewing angle. Even if when an angle of incidence of the light source is large, normal uniform backlighting may also be formed.

DETAILED DESCRIPTION

In order to make the above objects, features and advantages of the embodiments of the present disclosure more clear, the technical solutions according to the embodiments of the present disclosure will be clearly and fully described hereinafter in conjunction with the accompanying drawings in the embodiments of the present disclosure.

Figure 1:
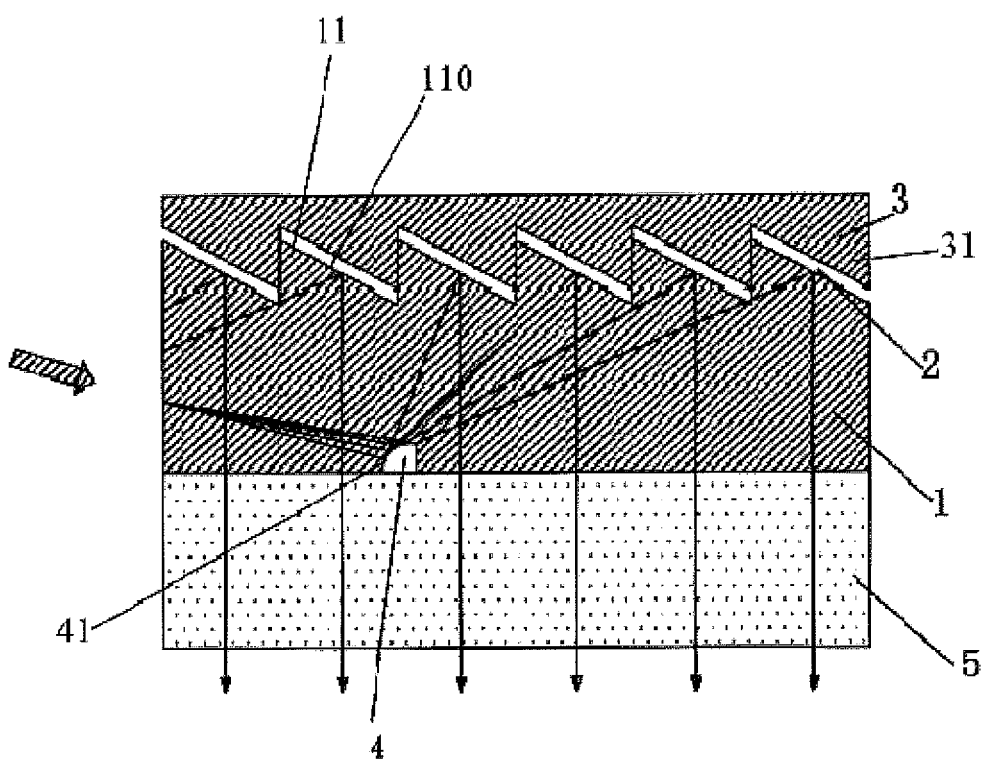
FIG. 1 is a schematic diagram showing a structure of a light transmission device according to one embodiment of the present disclosure.
Figure 2:
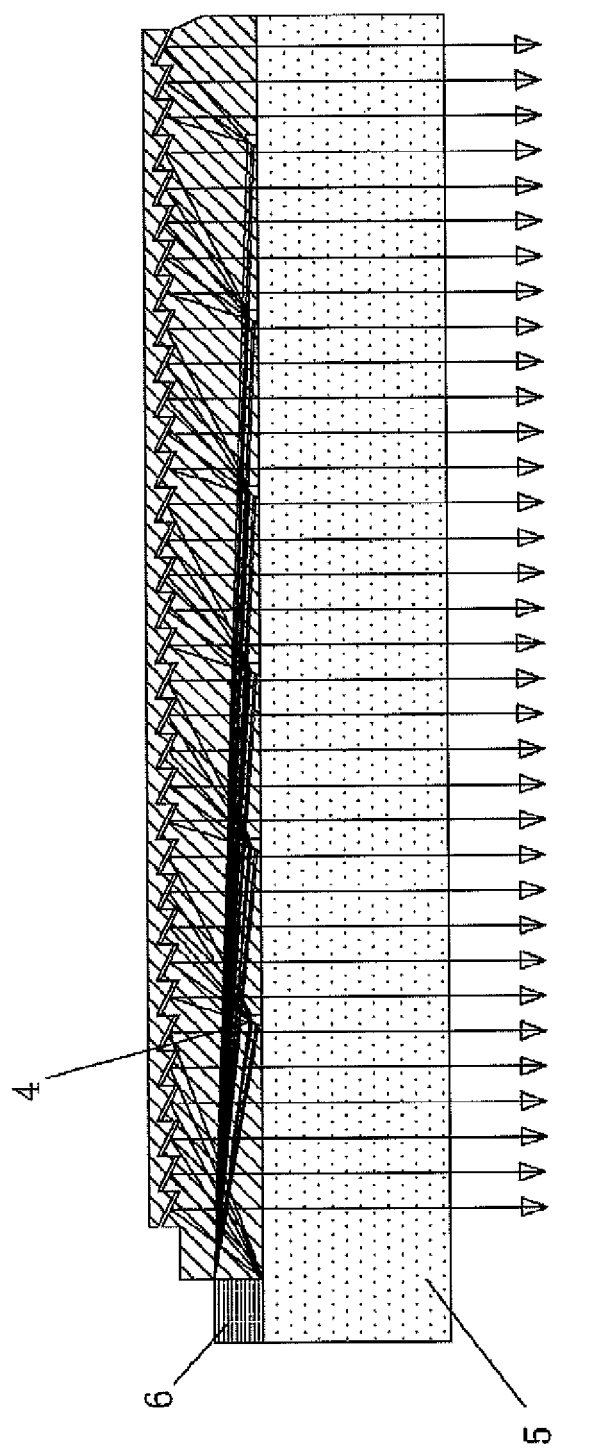
FIG. 2 is a schematic diagram showing an optical principle of the light transmission device of FIG. 1.

FIG. 1 is a schematic diagram showing a structure of a light transmission device according to one embodiment of the present disclosure. FIG. 2 is a schematic diagram showing an optical principle of the light transmission device of FIG. 1. As shown in FIG. 1 and FIG. 2, the light transmission device cooperates with a panel 5 to form a display device. The light transmission device includes a first prism layer 1.

A plurality of first prism bars 11 are formed on a surface of the first prism layer 1 facing away from a panel 5. A plurality of reflective grooves 4 are formed on a surface of the first prism layer 1 facing the panel 5.

Each of the reflective grooves 4 includes a plurality of reflective surfaces 41 (as shown in FIGS. 1-3 and FIG. 5) matching with prism surfaces 110 of the first prism bars 11. The reflective surfaces 41 reflect received light emitted from a collimated light source 6 to corresponding prism surfaces 110 of the first prism bars 11. The prism surfaces 110 of the first prism bars 11 are configured to emit received light reflected from the corresponding reflective surfaces 41 towards the panel 5 in a first direction. According to a placed position of the panel 5 in this embodiment, the first direction is vertical downward, i.e., the first direction is a direction perpendicular to the panel 5. If the panel 5 is placed in other directions, a corresponding first direction is a direction perpendicular to the panel 5. The following description will take the first direction being the vertical direction as an example for illustration.

The light transmission device of one embodiment of the present disclosure uses cooperation between the prism bars 11 and the reflective grooves 4 to realize emitting light from the light source in a single direction towards the panel 5, thereby forming a backlight source with a narrow viewing angle. Even if when an angle of incidence of the light source is larger, normal uniform backlighting may also be formed.

The first prism layer 2 of the present disclosure includes a first surface facing the panel 5, and a second surface facing away from the panel 5. The plurality of first prism bars 11 are formed on the second surface. The plurality of reflective grooves 4 are formed in the first surface. Each of the reflective grooves 4 includes a plurality of reflective surfaces 41 matching with the prism surfaces 110 of the first prism bars 11. The reflective surfaces 41 of the reflective grooves 4 correspond to the prism surfaces 110 of the first prism bars 11, so as to reflect the received light to corresponding prism surfaces 110 of the first prism bars 11. The prism surfaces 110 of the first prism bars 11 reflect light emitted from the corresponding reflective surfaces 41 towards the panel 5 in a single direction.

In this embodiment, the prism surfaces 110 of the first prism bars 11 totally reflect the received light, thereby reducing loss of the light. According to requirements of total reflection of light, the total reflection is a phenomenon that when a light strikes a medium boundary from an optically denser medium (i.e., higher refractive index of light in this medium) to an optically less medium (i.e., lower refractive index of light in this medium), if an angle of incidence of the light is greater than a critical angle, all the light is reflected back into the optically denser medium. In this embodiment, when light emits from the first prism layer 1 towards outside, since the first prism layer 1 has a higher refractive index, thus, it only needs to adjust the angle of incidence of the light so that the angle of incidence of the incident light is greater than the critical angle, and then the total reflection occurs. Therefore, the first prism layer 1 may also be referred as "light guide total reflection prism layer". Optionally, a spacer layer 2 having a refractive index lower than that of the first prism layer 1 may further be formed on an outer surface of the first prism bars 11. The spacer layer 2 may be made of material having a refractive index lower than that of the first prism layer 1, such as rubber, plastic, etc.

Figure 3:
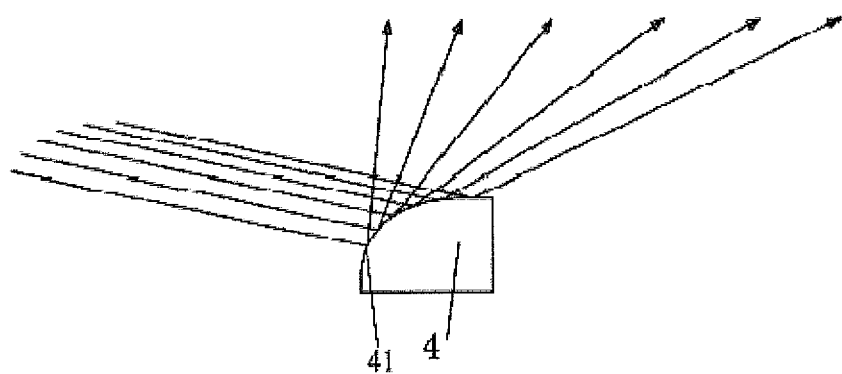
FIG. 3 is a schematic diagram showing a structure of a reflective groove according to one embodiment of the present disclosure.

FIG. 3 is a schematic diagram showing a structure of a reflective groove 4 according to one embodiment of the present disclosure. As shown in FIG. 3, a surface of the reflective groove 4 of this embodiment is a polygon structure with sides gradually changed with respect to each other.

Such a structure is configured to, when receiving uniformly parallel light, uniformly reflect the light towards a specified direction. This surface reflection uses the principle of the total reflection. In one embodiment, the reflective groove 4 may be a empty slot formed within the first prism layer 1, and the surface of the reflective groove 4 (i.e., surfaces of portions of the first prism layer 1 which surround the empty slot) includes a plurality of reflective surfaces 41 which are sequentially connected. When the light emitted from the collimated light source 6 enters the first prism layer 1 and irradiates on the reflective surfaces 41, the light emitted from the collimated light source 6 are totally reflected by the reflective surfaces 41. In one embodiment, angles between the reflective surfaces 41 of the reflective groove 4 and the horizontal direction are gradually increased or reduced along a direction from a position close to the collimated light source 6 to a position away from the collimated light source 6.

Figure 4:
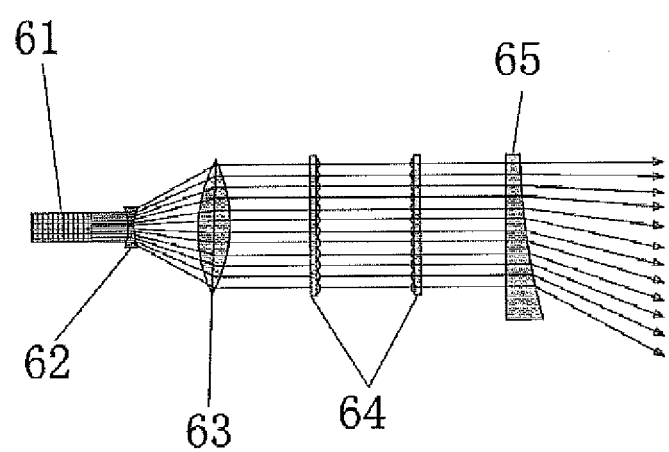
FIG. 4 is a schematic diagram showing a structure of a light source according to one embodiment of the present disclosure.

FIG. 4 is a schematic diagram showing a structure of the collimated light source 6 according to one embodiment of the present disclosure. As shown in FIG. 4, in this embodiment, the collimated light source 6 includes a light source 61, a doublet lens 62, a convex lens 63, a fly-eye lens group 64 and a curved lens 65. The light source 61 may adopt a light source (such as a laser light source, LED, etc.) having a small emergence angle.

The doublet lens 62 is formed by gluing a double concave lens made of high dispersion material to a single convex lens made of low dispersion material. Such a lens may expand beams without generating a chromatic aberration caused by light of different wavelengths. The convex lens 63 may be used to converge light. The fly-eye lens group 64 causes the preliminarily converged light to generate bunches of parallel light. The curved lens 65 uses the refraction principle to determine a final emergence direction of the light. In this embodiment, collimated light may be formed by using the above doublet lens 62, the convex lens 63, the fly-eye lens group 64 and the curved lens 65 which are sequentially arranged.

As shown in FIG. 4, when the light source 61 is turned on, the collimated light source 6 emits light beam of a specified direction. As shown in FIG. 2, since a distance between the collimated light source 6 and the reflective groove 4 is large, thus, the light beam entering the reflective grooves 4, i.e., incident light, is substantially parallel to the horizontal direction. The light beam emitted from the collimated light source 6 directly irradiates on the surfaces of the reflective grooves 4, and is reflected by the reflective grooves 4 to the prism surfaces 110 on a top surface of the first prism layer 1, respectively. In one embodiment, since the refractive index of the spacer layer 2 is lower than that of the first prism layer 1, the light reflected by the reflective grooves 4 to the first prism layer 1 are totally reflected at the prism surfaces 110 of the first prism layer 1, thereby emitting the light towards the panel 5 in the first direction and forming a backlight having a narrow viewing angle.

Figure 5:
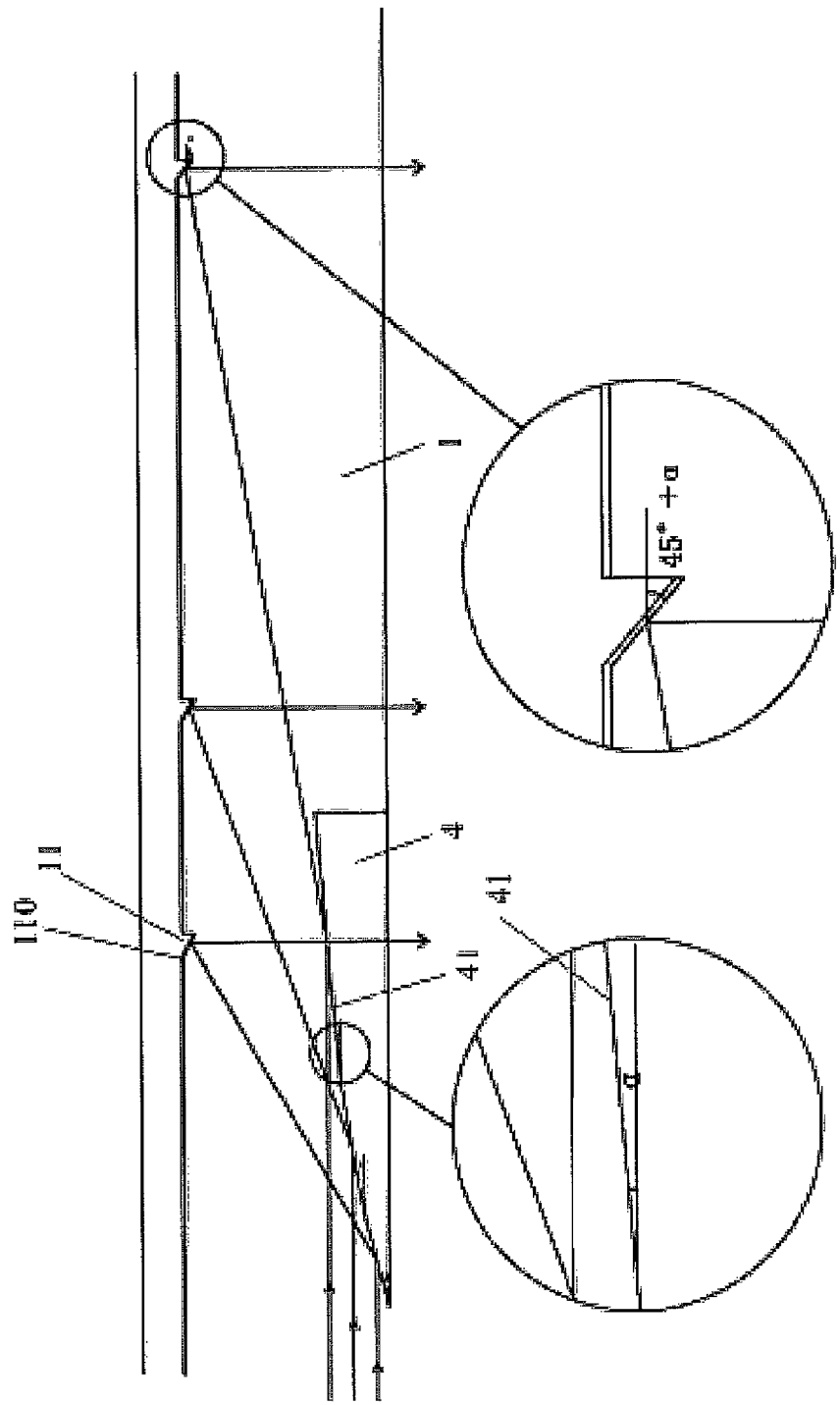
FIG. 5 is a partially enlarged view of a light transmission device according to one embodiment of the present disclosure.
Figure 6:
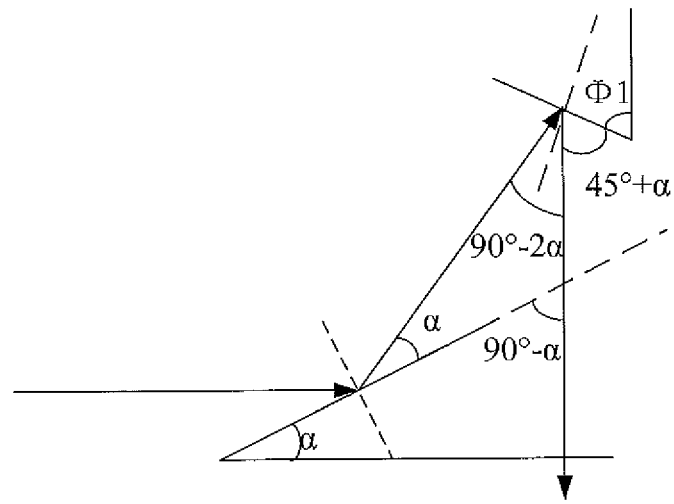
FIG. 6 is a schematic diagram showing an optical principle of the light transmission device of FIG. 5.

FIG. 5 is a partially enlarged view of a light transmission device according to one embodiment of the present disclosure. As shown in FIG. 5, in one embodiment, an angle between one of the reflective surfaces 41 of the reflective groove 4 and the horizontal direction (which is perpendicular to the first direction) is $\alpha$, and an angle $\Phi 1$ between the prism surface 110 corresponding to the one of reflective surfaces 41 and the vertical direction is $45°+\alpha$. FIG. 6 is a schematic diagram showing an optical principle of the light transmission device of FIG. 5. As shown in FIG. 6, a calculation process of the $\Phi 1$ includes: since the incidence direction of the light is the horizontal direction, thus, an angle between one reflective surface 41 corresponding to the light and the horizontal direction is $\alpha$; the light is finally reflected towards the panel along the vertical direction, therefore, $\Phi 1=45°+\alpha$. In one embodiment, the surface of the reflective groove 4 is a polygon structure with sides gradually changed with respect to each other. Such a structure is configured to, when receiving uniformly parallel light, uniformly reflect the light towards a specified direction. Assuming a light receiving surface composed of a plurality of reflective surface 41 of the reflective groove 4 defines a first angle of $3\times\alpha$ with respect to the horizontal direction, a second angle of $2\times\alpha$ with respect to the horizontal direction, and a third angle of $\alpha$ with respect to the horizontal direction. Corresponding angles of a total reflection layer of the first prism layer 1 are $45°+3\times\alpha$, $45°+2\times\alpha$ and $45°+\alpha$, respectively. The correspondence relationship includes: when an angle between the n-th reflective surface 41 of the reflective groove 4 and the horizontal direction is $n\times\alpha$, an angle between the vertical direction and the prism surface 110 corresponding to the n-th reflective surface 41 or an incline surface of the spacer layer 2 on the prism surface 110 corresponding to the n-th reflective surface 41 is $45°+n\times\alpha$.

Figure 7:
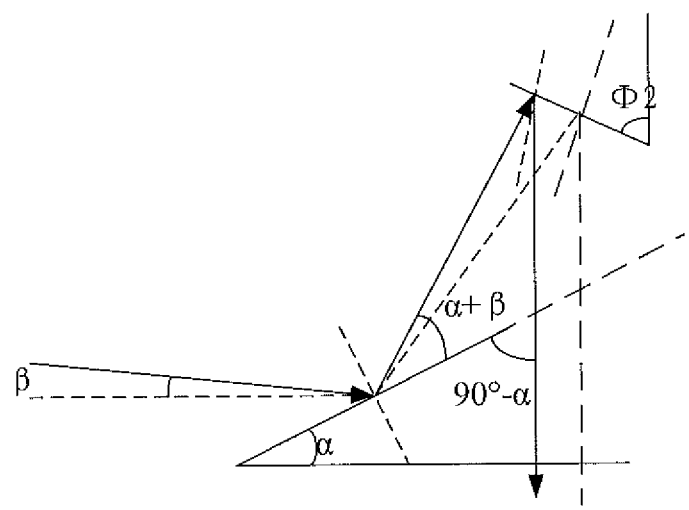
FIG. 7 is a schematic diagram showing an optical principle of a light transmission device according to another embodiment of the present disclosure.

FIG. 7 is a schematic diagram showing an optical principle of a light transmission device according to another embodiment of the present disclosure. As shown in FIG. 7, in this embodiment, an angle between an incident light and the horizontal direction is $\beta$, an angle between the horizontal direction and the reflective surface corresponding to the light is $\alpha$; the light is finally reflected towards the panel along the vertical direction, and an angle between the prism surface corresponding to the reflective surface and the vertical direction is $\Phi 2=45°+\alpha+\beta/2$.

Referring to FIG. 1 again, the light transmission device of one embodiment may further include a second prism layer 3. The second prism layer 3 includes a plurality of second prism bars 31. The second prism bars 31 match the first prism bars 11. In the light transmission device of this embodiment, the spacer layer 2 is disposed between the first prism bars 11 and the second prism bars 31, and is located between the first prism layer 1 and the second prism layer 3. The refractive index of the spacer layer 2 is lower than those of the first prism layer 1 and the second prism layer 3. The second prism layer 3 and the spacer layer 2 are configured to adjust optical path deflection direction of ambient light when the ambient light enters the first prism layer 1, to offset parts of deflection of the ambient light. Thus, the second prism layer 3 may also be referred as "optical path difference offset prism layer".

Figure 8:
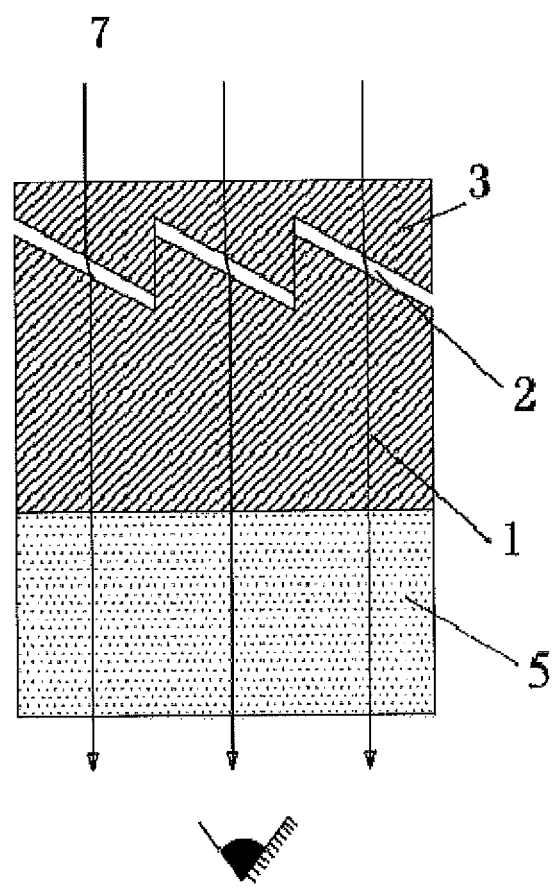
FIG. 8 is a schematic diagram showing an optical principle of a transparent display device according to one embodiment of the present disclosure.

FIG. 8 is a schematic diagram showing a structure of a transparent display device according to one embodiment of the present disclosure. As shown in FIG. 8, after the ambient light 7 passes through the second prism layer 3 and the spacer layer 2, parts of deflection of the ambient light may be offset. When the ambient light 7 is incident from the rear, the ambient light first passes through the second prism layer 3. The second prism layer 3 may effectively offset parts of deflection of the ambient light 7 occurred when the ambient light 7 passes through the first prism layer 1. Specifically, when the light passes through the spacer layer 2 such as a rubber layer, since the refractive index of the spacer layer 2 such as rubber layer is lower than that of the second prism layer 3, thus, the light is deflected at the spacer layer 2 such as rubber layer. When the light continues travelling to a top surface of the first prism layer 1, since the refractive index of the spacer layer 2 such as rubber layer is lower than that of the first prism layer 1, thus, the light is deflected again at the top surface of the first prism layer 1, so that the light is corrected back to the original light transmission path, and then travels vertically down through the panel 5 to be seen by people. This process is an effect of the second prism layer 3, i.e., optical path difference offset prism layer.

As described above, in one embodiment, the display device may be controlled to be in a backlight display mode or a transparent display mode by turning on or off the collimated light source 6. Specifically, the backlight display mode is: as shown in FIGS. 1-2, the collimated light source 6 is turned on, the light beam emitted from the collimated light source 6 irradiates on the reflective surfaces 41 of the reflective grooves 4, and is reflected by the reflective surfaces 41 to the corresponding prism surfaces 110 of the first prism bars 11, respectively, and then is totally reflected at the corresponding prism surfaces 110 of the first prism bars 11, thereby emitting the light towards the panel 5 in the first direction. The transparent display mode is: as shown in FIG. 8, the collimated light source 6 is turned off, the ambient light 7 sequentially passes through the optical path difference offset prism layer, i.e., the second prism layer 3, the spacer layer 2 and the light guide total reflection prism layer, i.e., the first prism layer 1, and then emits towards the panel 5 in the first direction.

One embodiment of the present disclosure also discloses a backlight module which includes the light transmission device.

One embodiment of the present disclosure also discloses a display device. The display device includes any one of the backlight modules of the above embodiments. The display device may be a liquid crystal panel, an electronic paper, an OLED panel, a mobile phone, a Tablet PC, a TV, a display, a note computer, a digital photo frame, a navigator, or any product or component having displaying function.

The foregoing are merely exemplary embodiments of the present disclosure. It should be appreciated that, a person skilled in the art may make further modifications and improvements without departing from the scope of the present disclosure, and these modifications and improvements should also be considered as within the scope of the present disclosure.

What is claimed is:

1. A light transmission device cooperated with a panel to form a display device, the light transmission device comprising:
    a first prism layer; wherein the first prism layer comprises a plurality of first prism bars formed on a surface of the first prism layer away from the panel, and a plurality of reflective grooves formed on a surface of the first prism layer facing the panel;
    each of the reflective grooves comprises a plurality of reflective surfaces matching with prism surfaces of the first prism bars; the reflective surfaces reflect received light to corresponding prism surfaces; the prism surfaces of the first prism bars are configured to emit received light reflected from corresponding reflective surfaces towards the panel in a first direction.

2. The light transmission device according to claim 1, wherein an angle between one of the reflective surfaces of one of the reflective grooves and a second direction which is perpendicular to the first direction is $\alpha$; an angle between a light incident on the one of the reflective surfaces and the second direction is $\beta$; an angle between the prism surface of the first prism layer corresponding to the one of the reflective surfaces and the first direction is $45°+\alpha+\beta/2$.

3. The light transmission device according to claim 2, wherein angles between the reflective surfaces of one of the reflective grooves and the second direction are gradually increased or reduced along a direction from a position close to a light source to a position away from the light source.

4. The light transmission device according to claim 1, wherein an angle between one of the reflective surfaces of one of the reflective grooves and a second direction which is perpendicular to the first direction is $\alpha$; a light is incident on the one of the reflective surfaces in the second direction; an angle between the prism surface of the first prism layer corresponding to the one of the reflective surfaces and the first direction is $45°+\alpha$.

5. The light transmission device according to claim 4, wherein angles between the reflective surfaces of one of the reflective grooves and the second direction are gradually increased or reduced along a direction from a position close to a light source to a position away from the light source.

6. The light transmission device according to claim 1, further comprising:
    a second prism layer and a spacer layer;
    wherein the second prism layer comprises a plurality of second prism bars formed on a surface of the second prism layer facing the first prism, and the second prism bars match the first prism bars;
    the spacer layer is disposed between the first prism layer and the second prism layer;
    the spacer layer has a refractive index lower than those of the first prism layer and the second prism layer;
    the second prism layer and the spacer layer are configured to adjust optical path deflection direction of ambient light when the ambient light enters the first prism layer to offset parts of deflection of the ambient light.

7. The light transmission device according to claim 6, wherein the spacer layer is a rubber layer.

8. A backlight module comprising a light transmission device according to claim 1.

9. The backlight module according to claim 8, further comprising a collimated light source configured to provide collimated light for reflective grooves of the light transmission device.

10. The backlight module according to claim 9, wherein the collimated light source comprises a light source, a doublet lens, a convex lens, a fly-eye lens group and a curved lens which are sequentially arranged.

11. A display device comprising:
    a panel; and
    a light guide total reflection prism layer disposed on the panel; wherein the light guide total reflection prism layer comprises a plurality of first prism bars formed on a surface of the light guide total reflection prism layer away from the panel, and a plurality of reflective grooves formed on a surface of the light guide total reflection prism layer facing the panel; each of the reflective grooves comprises a plurality of reflective surfaces matching with prism surfaces of the first prism bars; the reflective surfaces reflect received light to corresponding prism surfaces;
    the prism surfaces of the first prism bars are configured to emit received light reflected from the corresponding reflective surfaces towards the panel in a first direction.

12. The display device according to claim 11, further comprising:
    a spacer layer disposed on the light guide total reflection prism layer; and
    an optical path difference offset prism layer disposed on the spacer layer;
    wherein the optical path difference offset prism layer comprises a plurality of second prism bars formed on a surface of the optical path difference offset prism layer facing the light guide total reflection prism layer, and the second prism bars match the first prism bars;

the spacer layer has a refractive index lower than those of the optical path difference offset prism layer and the light guide total reflection prism layer.

13. The display device according to claim 12, wherein the spacer layer is a rubber layer.

14. The display device according to claim 12, further comprising a collimated light source;

wherein the collimated light source is located at a side of the light guide total reflection prism layer; the display device is controlled to be in a backlight display mode or a transparent display mode by turning on or off the collimated light source;

wherein the backlight display mode is: the collimated light source is turned on, light beam emitted from the collimated light source irradiates on the reflective surfaces of the reflective grooves and is reflected by the reflective surfaces to the corresponding prism surfaces of the first prism bars, respectively, and is totally reflected at the corresponding prism surfaces of the first prism bars to emit towards the panel in the first direction;

the transparent display mode is: the collimated light source is turned off, ambient light sequentially passes through the optical path difference offset prism layer, the spacer layer and the light guide total reflection prism layer, and then emits towards the panel in the first direction.

15. The display device according to claim 12, wherein the plurality of first prism bars are serrated; the plurality of second prism bars are serrated.

16. The display device according to claim 11, wherein the first direction is perpendicular to the panel.

17. The display device according to claim 11, wherein an angle between one of the reflective surfaces of one of the reflective grooves and a second direction which is perpendicular to the first direction is $\alpha$; an angle between a light incident on the one of the reflective surfaces and the second direction is $\beta$; an angle between the prism surface of the first prism layer corresponding to the one of the reflective surfaces and the first direction is $45°+\alpha+\beta/2$.

18. The display device according to claim 17, wherein angles between the reflective surfaces of one of the reflective grooves and the second direction are gradually increased or reduced along a direction from a position close to a light source to a position away from the light source.

19. The display device according to claim 11, wherein an angle between one of the reflective surfaces of one of the reflective grooves and a second direction which is perpendicular to the first direction is $\alpha$; a light is incident on the one of the reflective surfaces in the second direction; an angle between the prism surface of the first prism layer corresponding to the one of the reflective surfaces and the first direction is $45°+\alpha$.

20. The display device according to claim 19, wherein angles between the reflective surfaces of one of the reflective grooves and the second direction are gradually increased or reduced along a direction from a position close to a light source to a position away from the light source.

* * * * *